United States Patent [19]
Chisholm et al.

[11] 3,895,352
[45] July 15, 1975

[54] SIGNALLING SYSTEM FOR LOCATING ERROR SOURCE

[75] Inventors: Iain Gordon Chisholm; Peter John Wakeling, both of Chelmsford, England

[73] Assignee: The Marconi Company Limited, Chelmsford, England

[22] Filed: Jan. 29, 1973

[21] Appl. No.: 327,667

[30] Foreign Application Priority Data

Feb. 2, 1972 United Kingdom ................ 7355/72

[52] U.S. Cl. ............................ 340/171 R; 340/163
[51] Int. Cl. ............................................ H04b 3/46
[58] Field of Search .................... 340/163 R, 171 R; 179/170 F, 175.31 R

[56] References Cited

UNITED STATES PATENTS

| | | | |
|---|---|---|---|
| 3,061,679 | 10/1962 | Bachelet | 179/175.31 R |
| 3,210,671 | 10/1965 | Lofting | 179/175.31 R |
| 3,392,242 | 7/1968 | Smith | 179/175.31 R |
| 3,510,841 | 5/1970 | Lejon | 340/163 X |
| 3,513,443 | 5/1970 | Andersen | 340/163 X |
| 3,637,955 | 1/1972 | Tilly | 179/175.31 R |
| 3,715,723 | 2/1973 | Fletcher | 340/163 X |
| 3,728,681 | 4/1973 | Fuller | 340/163 X |

*Primary Examiner*—Harold I. Pitts
*Attorney, Agent, or Firm*—Baldwin, Wight & Brown

[57] ABSTRACT

A signalling system having a number of signal handling circuits situated in the signal path between a transmitter and receiver in which the transmitter transmits a number of tones each individual to one of the signal handling circuits. Each tone causes the appropriate signal handling circuit to energise an error detection circuit which modulates and retransmits the tone to the receiver.

2 Claims, 1 Drawing Figure

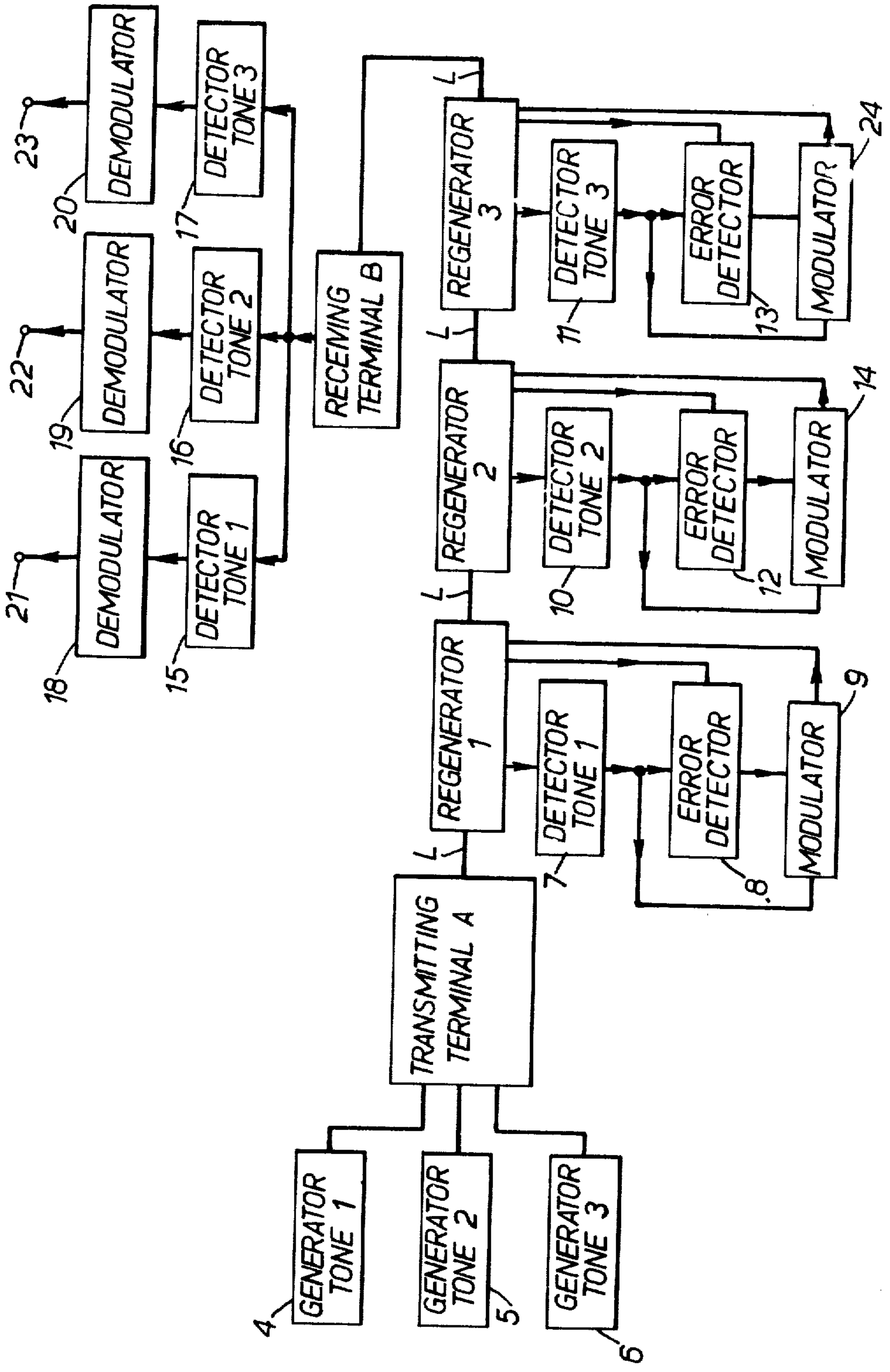
DEMODULATOR
DETECTOR TONE 3
DEMODULATOR
DETECTOR TONE 2
RECEIVING TERMINAL B
DEMODULATOR
DETECTOR TONE 1
REGENERATOR 3
DETECTOR TONE 3
ERROR DETECTOR
MODULATOR
REGENERATOR 2
DETECTOR TONE 2
ERROR DETECTOR
MODULATOR
REGENERATOR 1
DETECTOR TONE 1
ERROR DETECTOR
MODULATOR
TRANSMITTING TERMINAL A
GENERATOR TONE 1
GENERATOR TONE 2
GENERATOR TONE 3
L
1
2
3
4
5
6
7
8
9
10
11
12
13
14
15
16
17
18
19
20
21
22
23
24

SIGNALLING SYSTEM FOR LOCATING ERROR SOURCE

BACKGROUND OF THE INVENTION

This invention relates to signalling systems and more particularly to signalling systems of the kind in which a plurality of signal handling or processing arrangements are included between two signal handling terminals. The invention is particularly applicable to digital signal transmission systems in which signals are transmitted over a line between two terminals, there being provided a plurality of signal handling or processing arrangements (e.g. regenerators) spaced along the line. It is well known to apply monitoring techniques to such systems, the most common being some form of error detection means at the receiving terminal. Whilst such techniques satisfactorily indicate a fault in the aforesaid system, they do not provide an indication of the region in which the fault has occurred. Ideally error detection means should be provided at each of the signal handling and process arrangements along the line between the two terminals. A practical difficulty which militates against this, however, is the amount of power such individual error detection means would consume.

BRIEF SUMMARY OF THE INVENTION

The present invention seeks to provide an improved signal system in which the difficulties above referred to are reduced.

According to this invention a signalling system of the kind referred to includes means at a transmitting terminal, for transmitting a plurality of tones, each individual to a different intermediate signal handling or process arrangement in the path between the transmitting and receiving terminals, means at each intermediate arrangement responsive to the receipt of its individual tone for energising error detection means associated with that arrangement, means for modulating the individual tone with any signal produced by the error detection means and means for re-transmitting said tone to the receiving terminal. It will be appreciated that until energised the error detection means may be wholly inactive and consuming no power. Normally, at the receiving terminal there would be provided a detecting and demodulating arrangement for each tone to provide error indicating signals, where such exist, individual to each intermediate arrangement.

Preferably, the means for transmitting a plurality of tones is such that the tones may be transmitted individually at different times.

BRIEF DESCRIPTION OF THE DRAWINGS

The invention is illustrated in the accompanying drawing which is a block schematic diagram of a digital signal system in accordance with the present invention.

DETAILED DESCRIPTION OF THE INVENTION

Referring to the drawing, a transmitting terminal A is provided to transmit digital signals over a line L to a receiving terminal B. Along the line are so called regenerators of which three, 1, 2 and 3 are shown. In practice, of course, there may be many more regenerators. Associated with the transmitting terminal A are three tone generators 4, 5 and 6, each of which generates a unique tone of a frequency outside the frequency band of normal traffic signals to be transmitted between transmitting terminal A and receiving terminal B. The tone generators 4, 5 and 6 are connected to transmitting terminal A, so that when any of the tone generators 4, 5 and 6 are energised, tones generated thereby are applied to the line L.

Associated with regenerator 1 is a tone detector 7 arranged to detect tones generated by tone generator 4. Output from tone detector 7 is arranged to energise an error detector circuit 8 which monitors signals handled by regenerator 1. Tone output from tone detector 7 is also connected to a modulator 9, which is arranged to modulate the tone with any error signal output provided by error detector circuit 8. Output from modulator 9, modulated or unmodulated, is arranged to be retransmitted by regenerator 1 along the line L to the receiving terminal B.

Regenerators 2 and 3 each have associated therewith a tone detector 10 and 11 respectively, an error detector circuit 12 and 13 respectively and a modulator 14 and 24 respectively, which are arranged in similar fashion to the tone detector 7, error detector 8 and modulator 9 associated with regenerator 1, except that tone detector 10 is arranged to detect tones generated by tone generator 5 and tone detector 11 is arranged to detect tones generated by tone generator 6.

At the receiving terminal three tone detectors 15, 16 and 17 are connected to monitor signals received by signal receiving terminal B. Tone detector 15 is responsive to tones generated by tone detector 4, tone detector 16 is responsive to tones generated by tone generator 5 and tone generator 17 is responsive to tones generated by tone generator 6. Each tone detector 15, 16 and 17 is connected to an individual demodulator 18, 19 and 20 respectively, which provides output to a respective output terminal 21, 22 and 23.

In operation, tone generator 4 is energised which causes tone detector 7 to energise error detector circuit 8, which, for the duration of the tone generated by generator 4 monitors the operation of regenerator 1. The tone detected by detector 7 is meanwhile passing via modulator 9 and being re-transmitted by regenerator 1 along the line L to the receiving terminal B. At the receiving terminal B this tone is detected by tone detector 15 and demodulated by demodulator 18. If no error is apparent in the signals handled by regenerator 1, the tone received by receiving terminal B will be unmodulated and no output appears at terminal 21. Should an error be detected in the signals handled by regenerator 1, signals from error detector circuit 8 modulate the tone and appear at terminal 21 after demodulation by demodulator 18. After a predetermined time tone generator 4 is switched off and tone generator 5 energised in order to monitor signals handled by regenerator 2. In this case any error signal produced by error detector 12 will appear at terminal 22. After a further predetermined time tone generator 5 is switched off and tone generator 6 is energised in order to monitor signals handled by regenerator 3. Any error signals provided by error detector signal 13 will appear at terminal 23.

Any of the known error detecting techniques may be employed at the individual regenerators 1, 2 and 3. However, in the case of a line code known as 4B3T it is preferred to provide circuitry within each regenerator 1, 2 or 3, which is responsive to a digital signal consisting of a sequence of five consecutive zeros and upon the detection of such a digital sequence to provide an output signal to the responsive error signal detector 8, 12 or 13.

We claim:

1. In a line transmission system comprising a transmitting terminal, a receiving terminal, and a plurality of signal handling arrangements between the transmitting terminal and the receiving terminal, the combination of:

a plurality of tone generator means connected to said transmitting terminal for producing a set of tones less than all of which are transmitted to said receiving terminal at one time in which the tones of said set are different so as uniquely to identify each of said signal handling arrangements;

a plurality of tone transmitting loops, one associated with each signal handling arrangement, each loop including modulator means for modulating that tone unique to its associated signal handling arrangement, error detector means for causing said modulator means to modulate said unique tone in accord with the presence of a transmission error at the associated signal handling arrangement, and tone detector means for energizing said error detector means only in response to the presence of said unique tone; and means connected to said receiving terminal for determining the presence and location of an error source in response to the presence, if any, of said modulated unique tones.

2. A system as claimed in claim 1 and wherein the plurality of tone generator means is such that the tones may be transmitted individually at different times.

* * * * *

UNITED STATES PATENT AND TRADEMARK OFFICE

CERTIFICATE OF CORRECTION

PATENT NO. : 3,895,352

DATED : July 15, 1975

INVENTOR(S) : Iain Gordon Chisholm and Peter John Wakeling

It is certified that error appears in the above-identified patent and that said Letters Patent are hereby corrected as shown below:

In the patent heading, under "Foreign Application Priority Data" change the date of United Kingdom application 7355/72 from "Feb. 2, 1972" to --Feb. 17, 1972--.

Signed and Sealed this

*twentieth* Day of *January 1976*

[SEAL]

*Attest:*

RUTH C. MASON
*Attesting Officer*

C. MARSHALL DANN
*Commissioner of Patents and Trademarks*